(12) United States Patent
Haber et al.

(10) Patent No.: US 8,438,483 B2
(45) Date of Patent: May 7, 2013

(54) BANNER INTERFACE VIDEO FUNCTION NAVIGATION

(75) Inventors: Darrell Haber, Benicia, CA (US); Joel Zdepski, Mountain View, CA (US); Kevin Furuichi, San Anselmo, CA (US); Thierry Lehartel, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 516 days.

(21) Appl. No.: 12/204,948

(22) Filed: Sep. 5, 2008

(65) Prior Publication Data

US 2009/0063979 A1   Mar. 5, 2009

Related U.S. Application Data

(60) Provisional application No. 60/970,087, filed on Sep. 5, 2007.

(51) Int. Cl.
*G06F 3/00* (2006.01)
*G06F 3/048* (2006.01)

(52) U.S. Cl.
USPC ........... 715/719; 715/726; 715/815; 715/762; 715/810

(58) Field of Classification Search .................. 715/815, 715/762, 810, 840, 845, 719, 726
See application file for complete search history.

(56) References Cited

U.S. PATENT DOCUMENTS

| | | | |
|---|---|---|---|
| 5,528,304 A | 6/1996 | Cherrick et al. | |
| 5,583,560 A * | 12/1996 | Florin et al. | 725/40 |
| 6,298,482 B1 * | 10/2001 | Seidman et al. | 725/101 |
| 6,608,633 B1 * | 8/2003 | Sciammarella et al. | 715/700 |
| 6,871,323 B2 * | 3/2005 | Wagner et al. | 715/716 |
| 7,034,851 B1 | 4/2006 | Furui et al. | |
| 7,076,734 B2 * | 7/2006 | Wolff et al. | 715/720 |
| 7,143,428 B1 * | 11/2006 | Bruck et al. | 725/37 |
| 7,155,674 B2 * | 12/2006 | Breen et al. | 715/719 |
| 7,620,971 B2 * | 11/2009 | Lee | 725/151 |
| 2002/0010922 A1 | 1/2002 | Darin et al. | |
| 2002/0049973 A1 * | 4/2002 | Alten et al. | 725/40 |

(Continued)

FOREIGN PATENT DOCUMENTS

| | | |
|---|---|---|
| GB | 2360652 | 9/2001 |
| WO | WO-9935483 A1 | 7/1999 |
| WO | WO-9935843 A1 | 7/1999 |
| WO | WO-2009032243 A1 | 3/2009 |

OTHER PUBLICATIONS

"International Application Serial No. PCT/US2008/10315, Search Report and Written Opinion mailed Nov. 25, 2008".

(Continued)

*Primary Examiner* — Tadeese Hailu
(74) *Attorney, Agent, or Firm* — Schwegman Lundberg & Woessner, P.A.

(57) ABSTRACT

In an example embodiment, computer-implemented methods, apparatus, and systems to navigate extensible video functions are provided. These may operate to receive a first request for a banner interface region. In response, the banner interface region is rendered with video content. The banner interface region includes a graphical user interface that maps to a variety of extensible video functions. A second request to access one of the video functions may be received, and the selected extensible video function is then executed. Additional methods, apparatus, and systems are disclosed.

23 Claims, 8 Drawing Sheets

U.S. PATENT DOCUMENTS

| | | | |
|---|---|---|---|
| 2002/0174430 A1* | 11/2002 | Ellis et al. | 725/46 |
| 2003/0126607 A1 | 7/2003 | Rick et al. | |
| 2005/0235319 A1* | 10/2005 | Carpenter et al. | 725/52 |
| 2005/0240965 A1 | 10/2005 | Watson et al. | |
| 2005/0251822 A1 | 11/2005 | Knowles et al. | |
| 2006/0031904 A1 | 2/2006 | Groff et al. | |
| 2006/0230361 A1* | 10/2006 | Jennings et al. | 715/786 |
| 2006/0248475 A1* | 11/2006 | Abrahamsson | 715/835 |
| 2007/0052851 A1 | 3/2007 | Ochs et al. | |
| 2007/0101375 A1 | 5/2007 | Seth | |
| 2007/0275781 A1* | 11/2007 | Marshall et al. | 463/42 |
| 2009/0201420 A1* | 8/2009 | Brown et al. | 348/552 |

OTHER PUBLICATIONS

"European Application Serial No. 08828914.5, Extended European Search Report mailed Oct. 12, 2010", 14 pgs.

"European Application Serial No. 08828914.5, Extended European Search Report May 6, 2011", 7.

"Australian Application Serial No. 2008296968, First Examiner Report mailed Feb. 14, 2011", 3 pgs.

"Australian Application Serial No. 2008296968, Response filed Feb. 14, 2012 to Office Action mailed Feb. 14, 2011", 14 pgs.

"Australian Application Serial No. 2008296968, Subsequent Examiners Report mailed Mar. 23, 2012", 2 pgs.

\* cited by examiner

BANNER INTERFACE VIDEO FUNCTION NAVIGATION

RELATED APPLICATIONS

This patent application claims the benefit of priority, under 35 U.S.C. Section 119(e), to U.S. Provisional Patent Application Ser. No. 60/970,087, filed on Sep. 5, 2007, which is incorporated herein by reference in its entirety.

BACKGROUND

Video displays can be used to display a wide variety of media, including video content. In some cases, the video content is displayed in conjunction with a banner interface region.

BRIEF DESCRIPTION OF DRAWINGS

The present disclosure is illustrated by way of example and not limitation in the figures of the accompanying drawings, in which.

DETAILED DESCRIPTION

In a banner interface region displayed in conjunction with video content, there may be additional GUI regions that map to a variety of different video functions. Examples of such video functions include searching for television programs, listing previously viewed television programs, and other video functions. As explained in more detail below, the viewer may navigate within the banner interface region to access the video functions, as well as system services. In an example embodiment, all video functions associated with displayed video content may be accessible within the banner interface region. In another example embodiment, a portion of the video functions may be accessible within the banner interface region.

EXAMPLE SYSTEM AND METHODS

Figure 1:
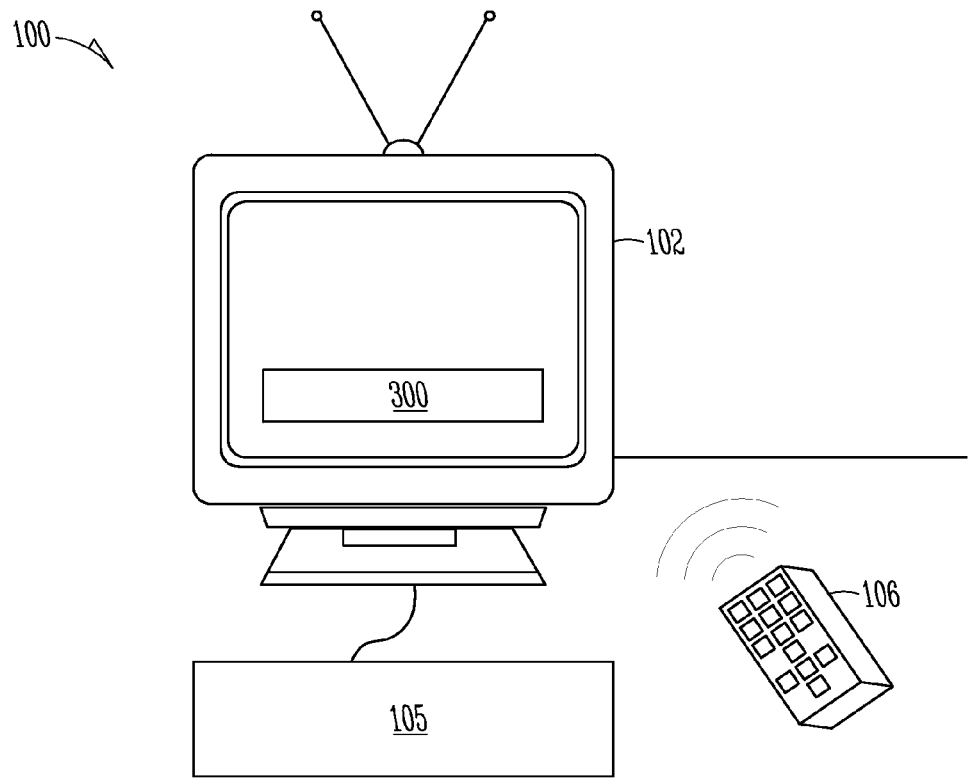
FIG. 1 is a block diagram of a video display system, in accordance with an example embodiment.

FIG. 1 is a block diagram of a video display system 100, in accordance with an example embodiment. Video display system 100 includes video display 102, computing device 105, and remote control device 106. Computing device 105 is in communication with video display 102. Examples of computing device 105 may include a cable box, a mobile phone, a personal digital assistant, a video display, a digital video recorder, a digital audio player, a digital media receiver, a game console, a remote server in a client-server system, and other computing devices. Computing device 105 is configured to render banner interface region 300 on video display 102 along with video content. As explained in more detail below, and shown in various figures, banner interface region 300 includes GUI regions that map to various video functions. As a result, a viewer can navigate within banner interface region 300, using remote control device 106 for example, to access a variety of video functions.

Figure 2:
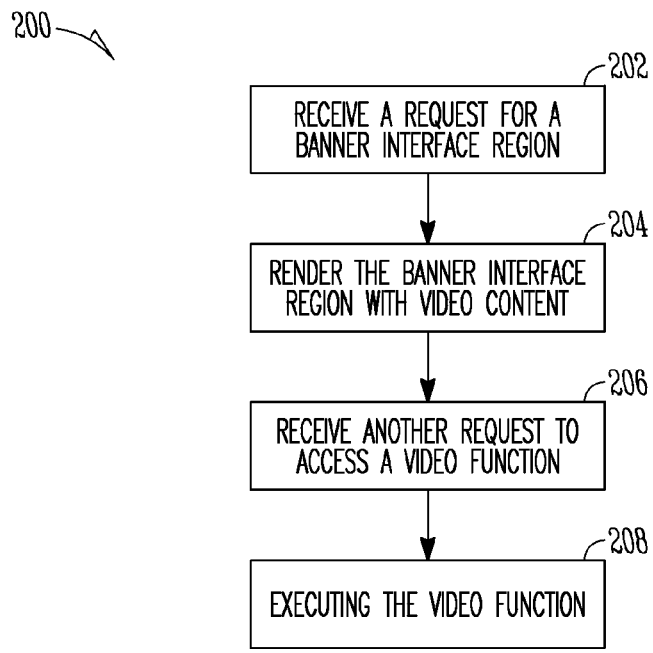
FIG. 2 is a flow diagram of various methods of navigating video functions, in accordance with an example embodiment.

FIG. 2 is a flow diagram of various methods 200 of navigating video functions, in accordance with an example embodiment. In an example embodiment, method 200 may be implemented by a GUI generation module that is employed in a computing device, such as computing device 105 of FIG. 1. As shown in FIG. 2, a request for a banner interface region is received at block 202. A viewer may initiate the request through, for example, a remote control device or other input devices. For example, a viewer may select an "information" key on a remote control device to initiate the request. Other example keys that can be used on the remote control device include the "back" key, the "exit" key, and other keys. In another example, a viewer may select a numerical key on a mobile device or keys from a keyboard of a computer to initiate the request.

In response to receiving the request, the banner interface region is rendered with video content at block 204. In general, the banner interface region comprises a GUI. The banner interface region may be formed in a variety of shapes, such as rectangles, squares, circles, triangles, and other shapes. In an example embodiment, the banner interface region may have a high-aspect ratio shape. An example of a high-aspect ratio shape can include a rectangle with wide length and short height. Conversely, a high-aspect ratio shape can also include a rectangle with tall height and narrow width. The banner interface region may span the width or height of a video display. Alternatively, the banner interface region may span a portion of the width or height of the video display.

The banner interface region and other GUI regions may be animated. In an example embodiment, the banner interface region is rendered or displayed with video content. For example, the banner interface region may be integrated with video content such that a viewer may continue viewing the video content while at the same time navigating video functions through use of the banner interface region. In another example embodiment, banner interface region is not rendered with video content or displayed simultaneously with video content. For example, banner interface region may not be rendered simultaneously with video content when the banner interface region is displayed on a small video display, such as a portable phone display.

The banner interface region includes one or more GUIs that map to one or more video functions. For example, a banner interface region may include tabs and icons. Each tab or icon may map to one or more video functions. Video functions may include a variety of commands and/or operations associated with the display of video. For example, a video function may include viewer functions, such as a search of television programs. Another video function may include system functions such as setting-up profiles for different viewers. Other examples of video functions include listing previously viewed television programs, listing television programs associated with particular television stations, listing recorded television programs, set-up options associated with a cable box, and other video functions. In an example embodiment, the banner interface region may include GUIs that map to every video function provided by a computing device. As such, a viewer may access all video functions through the banner interface region. In another example embodiment, the banner interface may include GUIs that map to a portion of the video functions provided by the computing device.

It should be noted that GUIs and their associated banner interface region can be displayed in a variety of ways. In an example embodiment, to be included in a banner interface region, a GUI is located within the boundaries of the banner interface region. In another example embodiment, to be included in a banner interface region, a GUI may be located adjacent to the boundaries of the banner interface region. For example, a GUI in the shape of a rectangular tab may be attached to the banner interface region. The GUIs included in the banner interface region may be displayed all at once. Alternatively, portions of GUIs may be embedded within other GUIs. For example, selecting a first GUI may trigger the display of a second GUI.

Still referring to FIG. 2, another request to access a video function may be received at block 206. A viewer may initiate the request by selecting a GUI included in the banner interface region. The viewer may navigate to the GUI by using an input device, such as a remote control device. In an example, a viewer may use directional keys forming part of a remote control device to navigate to various GUIs included within a banner interface region. Alternatively, a viewer may use specialized control keys forming part of a remote control device for navigation.

A variety of remote control devices may be utilized with a system for video function navigation, including, for example, controllers designed for games, such as those that have more than four directional buttons. Using points of a compass, for example, such controllers may have directional buttons labeled as "N", "NE", "E", "SE", "S", "SW", "W", and "NW." After the request is received at block 206, the video function associated with the selected GUI is executed at block 208.

Figure 3A:
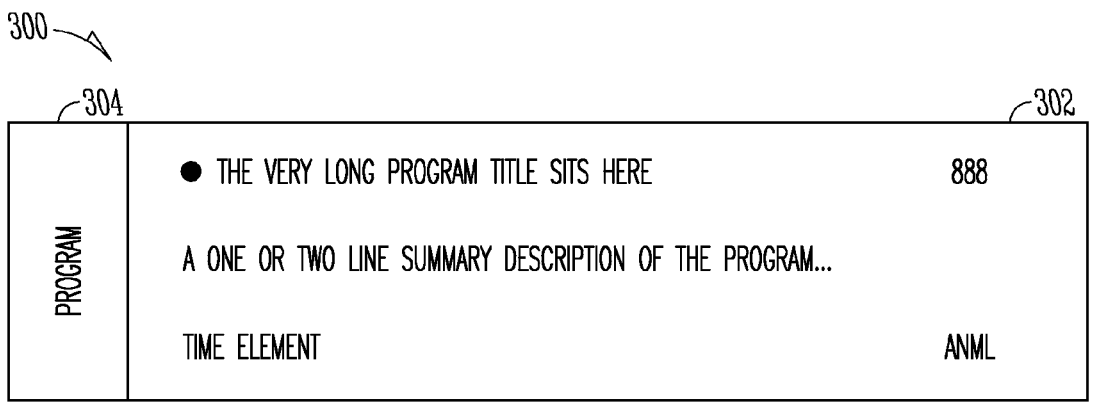
FIGS. 3A and 3B are schematic diagrams of default banner interface regions, in accordance with example embodiments.
Figure 3B:
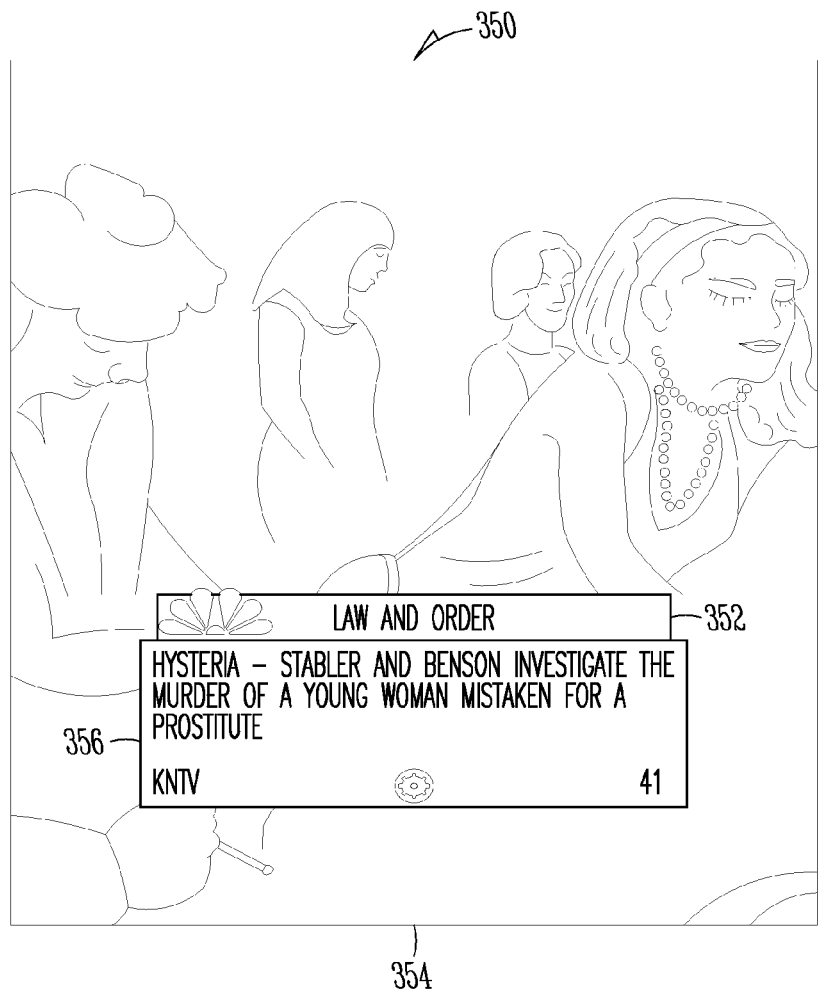

FIGS. 3A and 3B are schematic diagrams of default banner interface regions 300, 352, respectively, in accordance with example embodiments. As shown in FIG. 3A, default banner interface region 300 includes main GUI region 302 and program GUI region 304. The default banner interface region 300 may be displayed or rendered when a banner interface region is first invoked. For example, a viewer can invoke banner interface region 300 when viewing video content by selecting an "information" key on a remote control device or changing channels (as a function of selecting channel up/down functions, or by making a channel number entry). In the example embodiment shown in FIG. 3A, main GUI region 302 can include information about the video content that is currently displayed. Information can include the title of the television program, a short description of the television program, the channel that is broadcasting the television program, the time duration of the television program, and the category of the television program. In addition, default banner interface region 300 may also include program GUI region 304, in the shape of a rectangular tab, that identifies the content of main GUI region 302. Identification may include a description of the associated main GUI region 302. For instance, program GUI region 304 includes the description "program" that identifies the information included within the adjacent main GUI region 302 to relate to the current video content that is displayed.

As described above, banner interface region 300 and GUI regions 302 and 304 may have a variety of different shapes and sizes. FIG. 3B shows another example embodiment of a banner interface region 352. As shown in FIG. 3B, banner interface region 352 includes main GUI region 356 and program GUI region 354. Similar to main GUI region 302 of FIG. 3A, main GUI region 356 also includes information related to the video content that is currently displayed. However, unlike tab-shaped program GUI region 304 illustrated in FIG. 3A, program GUI region 354 of FIG. 3B is an icon that is shaped similar to a mechanical gear.

As illustrated in FIG. 3B, in an example embodiment, banner interface region 352 is rendered with video content 350. Banner interface region 352 may be displayed in a variety of locations within a viewing area of a video display. For example, as shown in FIG. 3B, banner interface region 352 may be displayed within video content 350 and is located at a lower portion of the viewing area. Other example locations include the middle of the viewing area, the top quarter portion of the viewing area, and other locations. In another example, banner interface region 352 may be displayed in the margins of a viewing area (e.g., along the edges of video content, or at the periphery of a viewing area). Alternatively, banner interface region 352 may be displayed such that the banner interface region does not obscure video content 350. The margin may extend around the entire periphery of the viewing area or a portion of the viewing area.

Figure 4A:
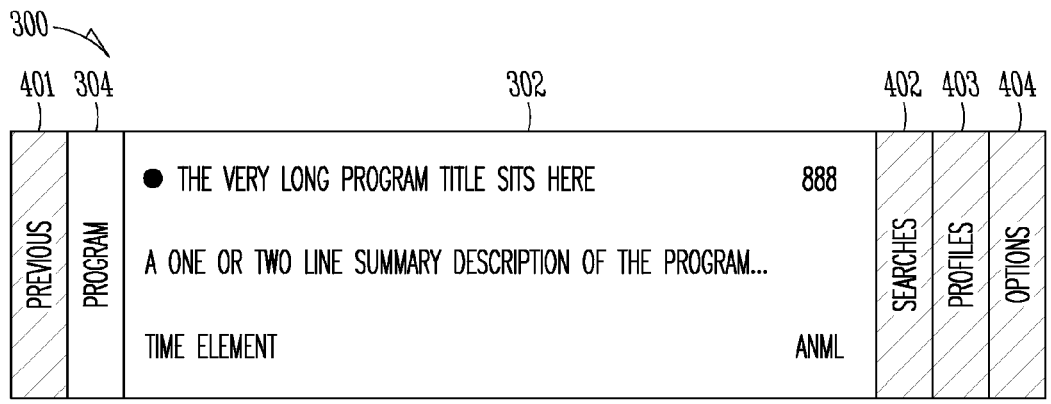
FIGS. 4A and 4B are schematic diagrams of expanded banner interface regions, in accordance with example embodiments.
Figure 4B:
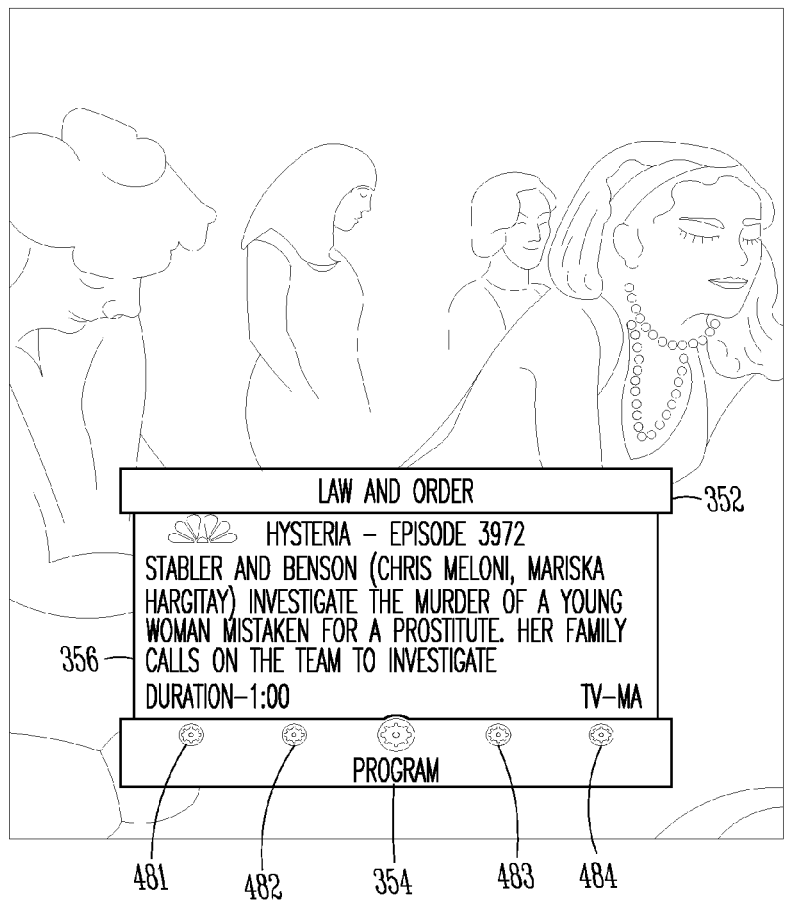

FIGS. 4A and 4B are schematic diagrams of expanded banner interface regions 300, 352, respectively, in accordance with example embodiments. As shown in FIG. 4A, expanded banner interface region 300 includes main GUI region 302 and program GUI region 304. Additionally included in banner interface region 300 are previous GUI region 401, searches GUI region 402, profiles GUI region 403, and options GUI region 404. GUI regions 401-404, which are in the shapes of rectangular tabs, are generated in response to receiving a command from an input device or in response to selection of a GUI (not shown) within banner interface region 300. In an example, GUI regions 401-404 can be generated in response to receiving a second selection of the "information" key from a remote control device. In generating GUI regions 401-404, the GUI regions may be animated such that the GUI regions extend outward, along horizontal directions 450 and 451. For example, previous GUI region 401 extends outward along direction 450 when a viewer selects the "information" key a second time. Similarly, GUI regions 402-404 extend outward along direction 451 when the viewer selects the "information" key a second time. GUI regions 401-404 may also be generated in response to a single selection of a variety of specially-designated keys from a remote control device that map to one or more video functions.

GUI regions 401-404 are generated or displayed to provide access to additional video functions. GUI regions 401-404 therefore map to different video functions than may be currently displayed. As explained in more detail below, previous GUI region 401 maps to a listing or display of previous television programs, searches GUI region 402 maps to a search video function, profiles GUI region 403 maps to an edit profile video function, and options GUI region 404 maps to an edit options video function. It should be appreciated that these listed video functions are merely examples. GUI regions 304 and 401-404 may map to a variety of video functions and/or provide access to additional sub-video functions.

To select the video function associated with GUI regions 401-404, a viewer may use an input device. For example, a viewer may navigate within and select a GUI region 304, 401, 402, 403 or 404 with arrow keys of a remote control device. GUI regions 304 and 401-404 may be associated with the arrow keys and may be displayed in such a way that the GUI regions reinforce a viewer's key-menu association. For example, as shown in FIG. 4A, previous GUI region 401 and program GUI region 304 can be associated with a "left" arrow key and may be displayed or located near the left edge of banner interface region 300. Conversely, searches GUI region 402, profiles GUI region 403, and options GUI region 404 can be associated with a "right" arrow key and may be displayed near the right edge of banner interface region 300. Similarly, if GUI regions 304 and 401-404 are associated with the "up" arrow key, then the GUI regions may be displayed near the top edge of banner interface region 300. If GUI regions 304 and 401-404 are associated with the "down" arrow key, then the GUI regions 304 and 401-404 may be displayed near the bottom edge of banner interface region 300.

FIG. 4B shows another example embodiment of an expanded banner interface region 352. As shown in FIG. 4B, expanded banner interface region 352 includes main GUI region 356 and program GUI region 354. Additionally included in expanded banner interface region 352 are GUI regions 481-484, which are in the shapes of mechanical gears, and generated in response to a command selection received from an input device or in response to selection of a GUI (not shown) within banner interface region 352. Each GUI region 481- 484 may map to a variety of different video functions, such as a listing of previous television programs, search video function, edit profile video function, or edit options video function.

To select the video function associated with GUI regions 481-484, a viewer may use an input device. For example, a viewer may navigate within and select one of the GUI regions 481-484 with "left" or "right" arrow key of a remote control device.

Figure 5A:
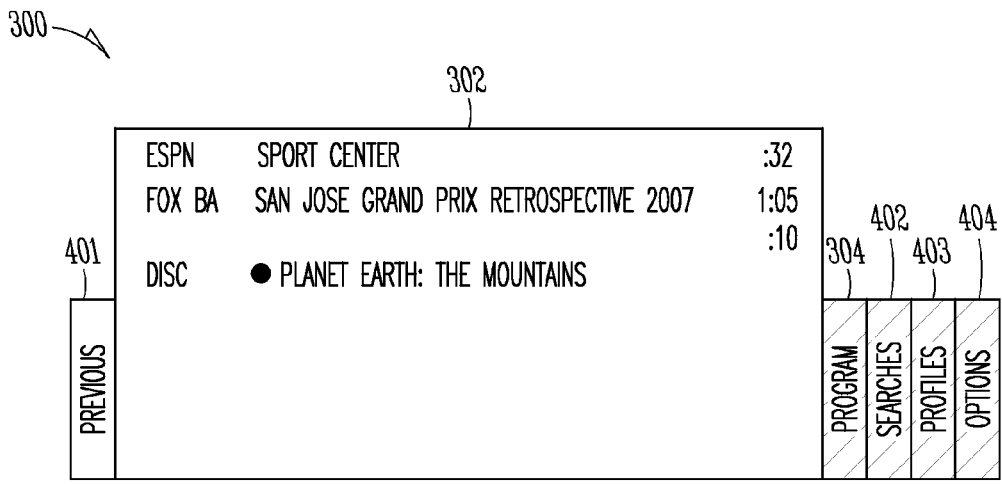
FIGS. 5A and 5B are schematic diagrams of banner interface regions associated with a previous video function, in accordance with example embodiments.
Figure 5B:
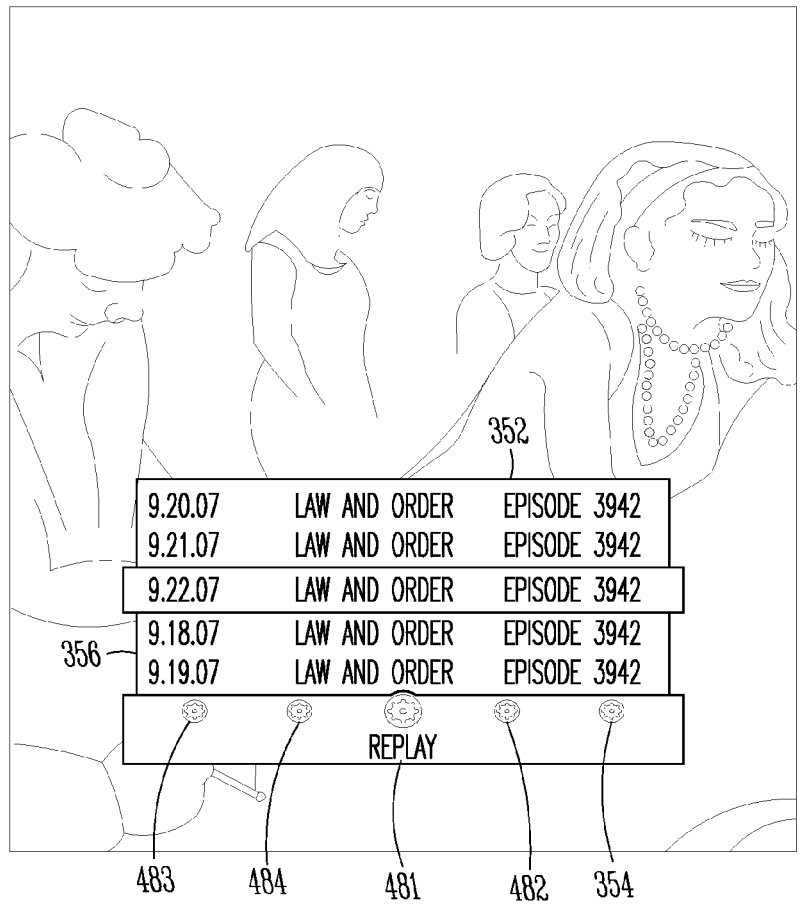

FIGS. 5A and 5B are schematic diagrams of banner interface regions 300, 352, respectively, associated with the previous video function, in accordance with example embodiments. As shown in FIG. 5A, banner interface region 300 includes main GUI region 302, program GUI region 304, previous GUI region 401, searches GUI region 402, profiles GUI region 403, and options GUI region 404.

To access the previous video function, a viewer may navigate to and select previous GUI region 401 with, for example, use of a "left" arrow key on a remote control device. As discussed above, the previous video function or a variety of other video functions described below may also be generated in response to a single selection of a variety of specially-designated keys from a remote control device that map to the video function. The selection of previous GUI region 401 results in triggering execution of the previous video function. The previous video function provides a list of previously aired or shown television programs. The television programs may be associated with a particular television program, a particular television station, a particular viewer, a recommendation based on the currently viewed television program, or other parameters. For example, as shown in FIG. 5A, the viewer may navigate to previous GUI region 401 and, as a result, main GUI region 302 displays a list of television programs that have been viewed by the user. As listed in main GUI region 302, the television programs include "SportCenter," "San Jose Grand Prix," and "Planet Earth." The viewer may further use the "up" or "down" arrow keys of a remote control device to navigate within the list. The list may extend beyond the television programs immediately visible in GUI region 302, which allows the viewer to continue navigating up or down while the list refreshes with new content. For example, a user may use the "up" arrow key to navigate to "Sport-Center" and select the program "SportCenter" with another key for playback or, with a live television program, a tune-back.

FIG. 5B shows another example embodiment of banner interface region 352 associated with the previous video function. As shown in FIG. 5B, banner interface region 352 includes main GUI region 356, program GUI region 354, previous (or replay) GUI region 481, searches GUI region 482, profiles GUI region 483, and options GUI region 484. A viewer may navigate to previous GUI region 481 by, for example, using the "left" or "right" arrow key on a remote control device. As a result, main GUI region 356 displays a list of television programs that are associated with a particular television program being viewed. Here, such television programs are previous episodes of a particular television program, such as previous episodes aired from Sep. 19, 2007 to Sep. 22, 2007. Again, the viewer may further use the "up" or "down" arrow keys of the remote control device to navigate within the list, and use another key to select one of the previous episodes for playback.

Figure 6A:
FIGS. 6A, 6B, and 6C are schematic diagrams of banner interface regions associated with a search video function, in accordance with example embodiments.
Figure 6B:
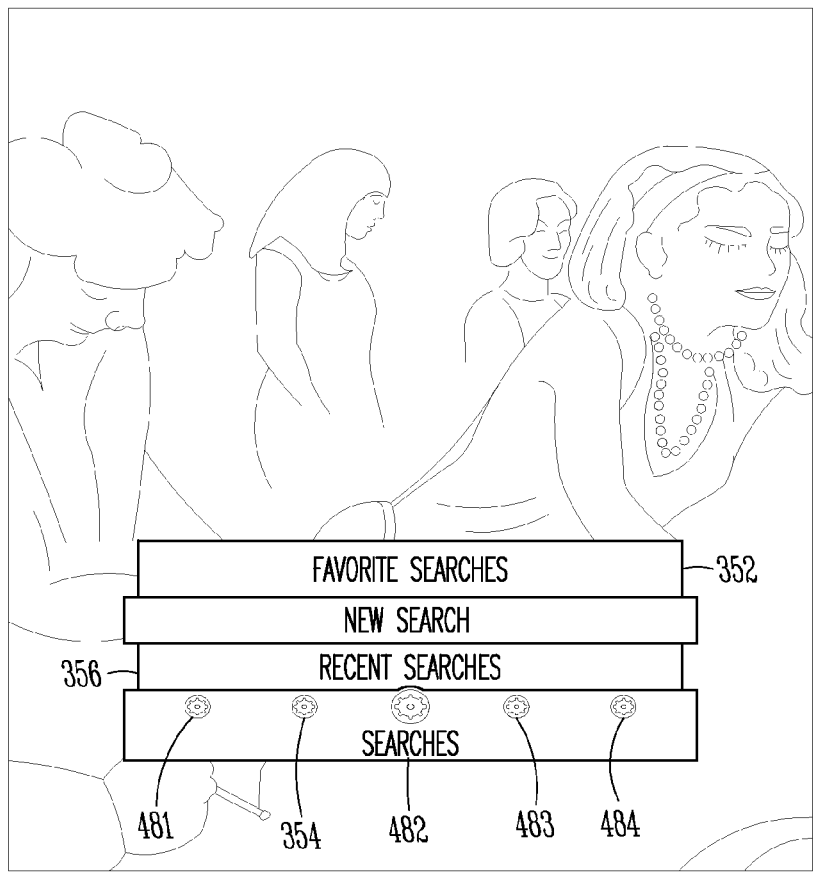
Figure 6C:

FIGS. 6A, 6B, and 6C are schematic diagrams of banner interface regions 302, 352, and 602, respectively, associated with the search video function, in accordance with example embodiments. As shown in FIG. 6A, banner interface region 300 includes main GUI region 302, program GUI region 304, previous GUI region 401, searches GUI region 402, profiles GUI region 403, and options GUI region 404. To access the search video function, a viewer may navigate to and select searches GUI region 402 with, for example, use of a "left" or "right" arrow key on a remote control device. The selection of previous GUI region 401 results in triggering execution of the search video function. In the example embodiment of FIG. 6A, the search video function provides a list of television programs and categories that may be searched. The list of television programs may be derived from a previous search or derived from terms within the television programs. The viewer may further use the "up" or "down" arrow key of the remote control device to navigate within the list. For example, a user may use the "down" arrow key to navigate to a previously searched television program called "San Francisco Giants Live . . . " and select that program with another key to view.

FIG. 6B shows another example embodiment of banner interface region 352 associated with the search video function. As shown in FIG. 6B, banner interface region 352 includes main GUI region 356, program GUI region 354, previous GUI region 481, searches GUI region 482, profiles GUI region 483, and options GUI region 484. A viewer may navigate to searches GUI region 482 by, for example, using a "left" or "right" arrow key on a remote control device. As a result, main GUI region 356 may display a list of different types of searches, such as "favorite searches," "new search," and "recent searches." The viewer may further use the "up" or "down" arrow keys of the remote control device to navigate within the list, and use another key to select a search type.

As shown in FIG. 6C, the selection of a search type (e.g., those shown in FIG. 6B) may trigger the generation of search box region 602 that enables a viewer to input the query used for the search, such as the name of a television program, the category of a television program, the television program date, and other queries. In an example embodiment, a viewer may enter a query by making selections from a wheel of letters, utilizing the arrow keys of a remote control device. Once a letter is selected, for example, by moving the wheel of letters using the "up" and "down" arrow keys and then using the "right" arrow key to finalize the choice of a letter, the next wheel of letters is presented in response to the user activating the right arrow key. Each consecutive wheel of letters may have a reduced selection of letters, based on an algorithmic analysis of the preceding letter frequency in conjunction with sub-sequential letter frequency in the terms stored in the dictionary. Completion of the search term may be indicated by receiving the selection of a "select" key on the remote control device.

It should be noted that the banner interface regions 300 and 352 of FIG. 6A and 6B, respectively, may be used for a variety of searches. An example of a search type includes favorite searches. A viewer may want to search for similar types of content that have been searched in the past. In favorite searches, a search may be saved and the viewer may access the saved search at a later time. Another example of a search is recent searches. Here, a history or list of results from previous searches is saved. The recent search selection allows a viewer to view and access the history of results from previous searches.

Figure 7A:
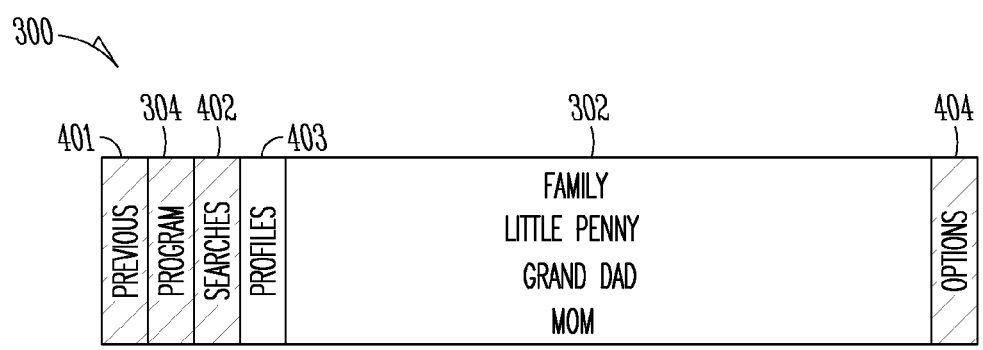
FIGS. 7A and 7B are schematic diagrams of banner interface regions associated with a profile video function, in accordance with example embodiments.
Figure 7B:
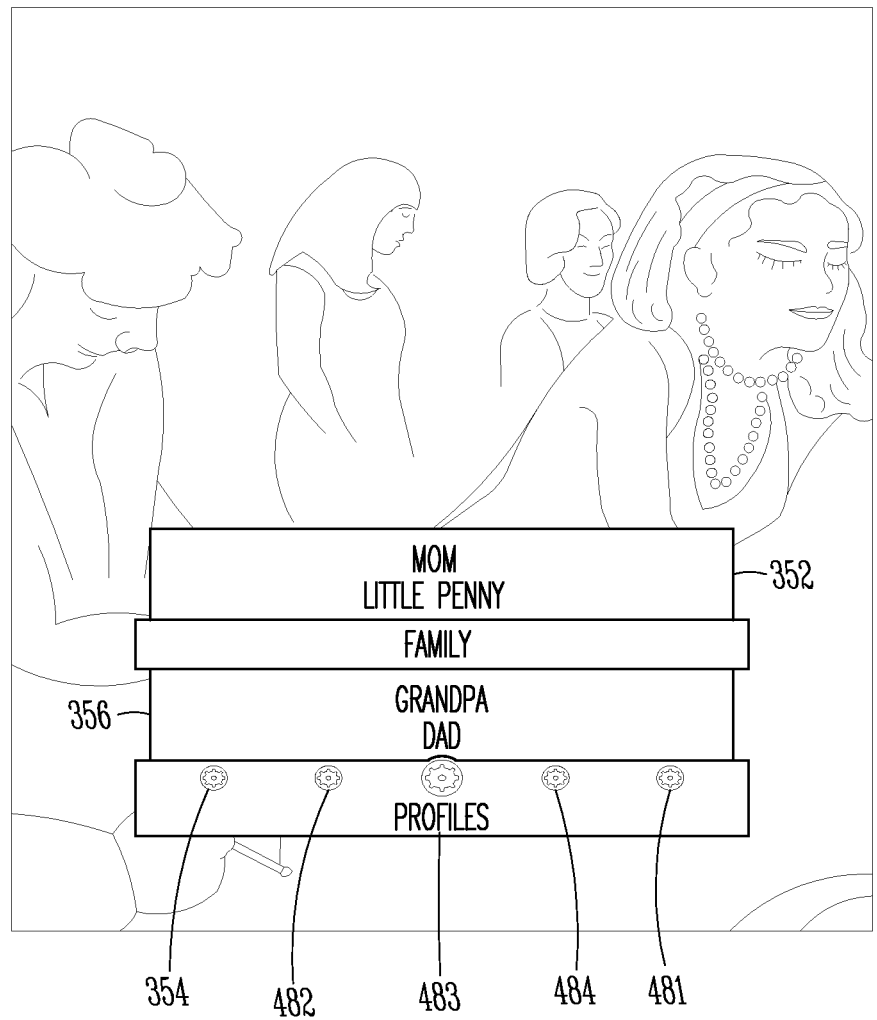

FIGS. 7A and 7B are schematic diagrams of banner interface regions 302, 352, respectively, associated with the profile video function, in accordance with example embodiments. As shown in FIG. 7A, banner interface region 300 includes main GUI region 302, program GUI region 304, previous GUI region 401, searches GUI region 402, profiles GUI region 403, and options GUI region 404. To access the profile video function, a viewer may navigate to and select profiles GUI region 403 by, for example, using a "left" or "right" arrow key on a remote control device. The selection of profiles GUI region 403 results in triggering execution of the profile video function. In the example embodiment of FIG. 7A, the profile video function provides a list of names. The viewer may further use the "up" or "down" arrow key of the remote control device to navigate within the list. For example, a user may use the "down" arrow key to navigate to "Mom" and select "Mom" with another key to view.

With the "Mom" name selected, main GUI region 302 may provide the preferences associated with "Mom." Examples of preferences include font size, color of GUIs, theme of the GUIs, and other preferences. The viewer may edit the preferences for "Mom" from the list of preferences. It should be noted that each profile may be associated with a different number of displayed GUI regions (e.g., GUI regions 401, 304, 402, 403, and/or 404). For example, selecting the "Mom" profile may result in the display of GUI regions 401, 304, 402, 403, and/or 404. On the other hand, a selection of "Little Penny" profile may operate to remove searches GUI region 402.

FIG. 7B shows another example embodiment of banner interface region 352 associated with the profile video function. As shown in FIG. 7B, banner interface region 352 includes main GUI region 356, program GUI region 354, previous GUI region 481, searches GUI region 482, profiles GUI region 483, and options GUI region 484. A viewer may navigate to profiles GUI region 483 by, for example, using a "left" or "right" arrow key on a remote control device. As a result, main GUI region 356 displays a list of names. The viewer may further use the "up" or "down" arrow keys of the remote control device to navigate within the list, and use another key to select a name for viewing and/or editing a preference associated with the name.

It should be appreciated that any number of suitable layouts can be designated for the GUI regions illustrated above, since FIGS. 3A-7B do not represent all possible layout options available. The displayable appearance of the regions can be defined by a variety of geometric shapes (e.g., rectangle, square, circle, triangle, etc.), alphanumeric characters (e.g., A, v, t, Q, 1, 9, 10, etc.), symbols (e.g., $, *, @, Ω, ∞, etc.), shading, pattern (e.g. solid, hatch, stripes, dots, etc.), and color.

Furthermore, previous GUI region 401 of FIG. 5A, as well as other regions, may be omitted or dynamically assigned. It should also be appreciated that the location of the GUI regions can be fixed or customizable. In addition, the computing devices that are used may present a fixed set of layouts, utilize a defined protocol or language to define a layout, or an external structure can be reported to the computing device that defines the layout. Finally, clicking on or selecting a region as discussed above may trigger code to cause the operations described herein to occur.

Systems and Media

Figure 8:
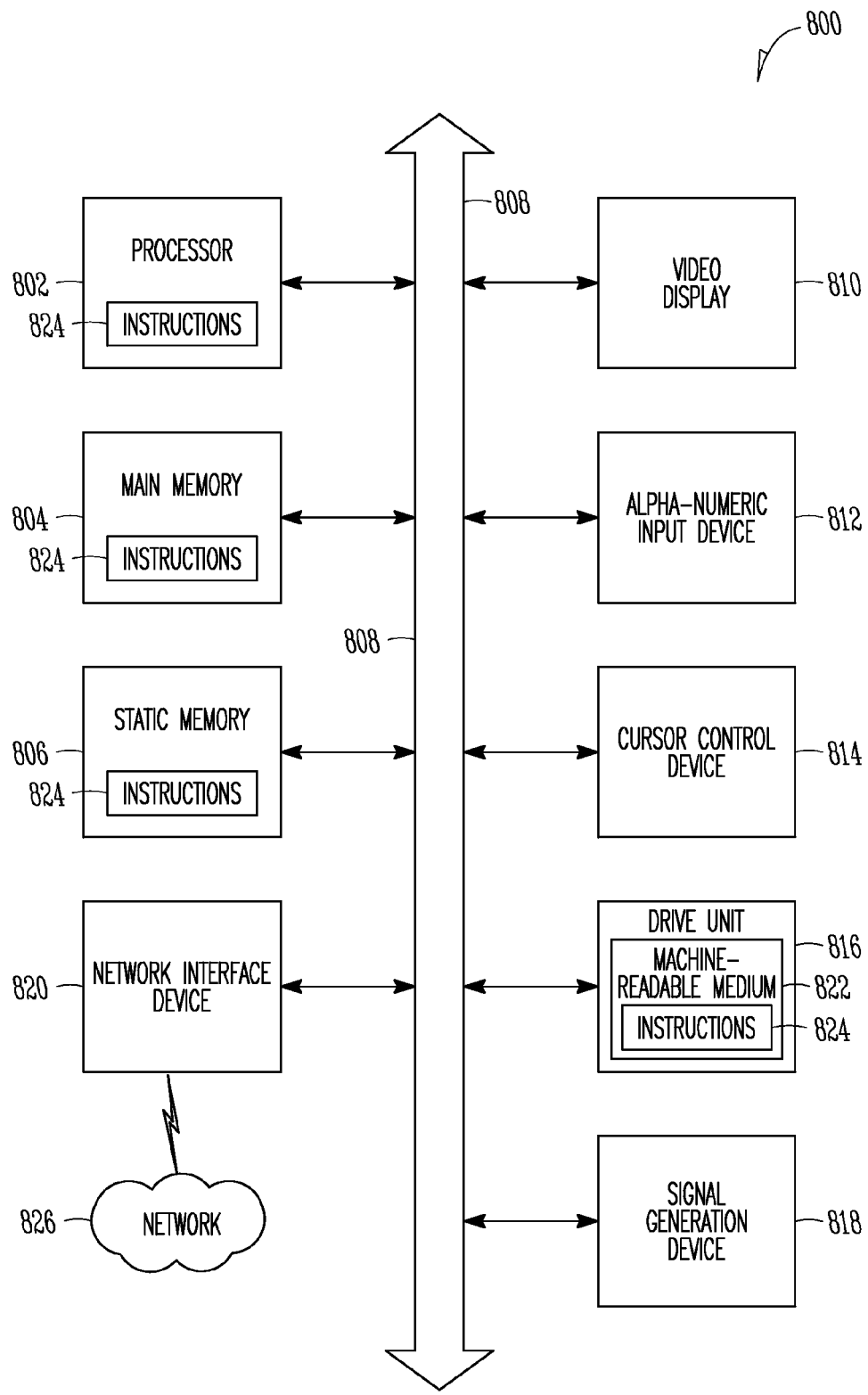
FIG. 8 is a block diagram of a machine in the example form of a computing device, in accordance with an example embodiment.

FIG. 8 is a block diagram of a machine in the example form of a computing device, in accordance with an example embodiment. Within the machine, a set of instructions may be executed to cause the machine to perform any one or more of the methodologies discussed herein. In alternative embodiments, the machine operates as a standalone machine. It may also be connected (e.g., networked) to other machines. In a networked deployment, the machine may operate in the capacity of a server or a client machine in server-client network environment, or as a peer machine in a peer-to-peer (or distributed) network environment. The machine may comprise a cable box, a mobile phone, a personal digital assistant, a video display, a digital video recorder, a digital audio player, a digital media receiver, a game console, or any machine capable of executing a set of instructions (sequential or otherwise) that specify actions to be taken by that machine. Further, while only a single machine is illustrated as a machine, the term "machine" shall also be taken to include any collection of machines that individually or jointly execute a set (or multiple sets) of instructions to perform any one or more of the methodologies discussed herein.

The machine, in the example form of a computer system 800 includes processor 802 (e.g., a central processing unit (CPU) and/or a graphics processing unit (GPU)), main memory 804, and static memory 806, which communicate with each other via bus 808. Computer system 800 may further include video display unit 810 (e.g., a plasma display, a liquid crystal display (LCD) or a cathode ray tube (CRT), etc.). Computer system 800 also includes alphanumeric input device 812 (e.g., a keyboard), user interface (UI) navigation device 814 (e.g., a mouse), disk drive unit 816, signal generation device 818 (e.g., a speaker), and network interface device 820.

Disk drive unit 816 includes machine-readable medium 822 on which is stored one or more sets of instructions and data structures (e.g., software 824) embodying or utilized by any one or more of the methodologies or functions described herein. Software 824 may also reside, completely or at least partially, within main memory 804 and/or within processor 802 during execution thereof by computer system 800. The main memory 804 and processor 802 may also comprise machine-readable, tangible media.

Software 824 may further be transmitted or received over network 826 via network interface device 820 utilizing any one of a number of well-known transfer protocols (e.g., HTTP).

While machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical and magnetic media, and other media.

Although specific example embodiments have been described, it will be evident that various modifications and changes may be made to these embodiments without departing from the broader scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, comprising:
   receiving a first request for a banner interface region;
   rendering the banner interface region with video content, the banner interface region including a plurality of graphical user interfaces that map to a corresponding plurality of video functions, wherein the plurality of graphical user interfaces are animated to extend outward simultaneously along horizontal directions in response to the first request;
   receiving a second request to access a selected one of the plurality of graphical user interfaces; and
   executing a video function of the plurality of video functions, the executed video function corresponding to the selected one of the plurality of graphical user interfaces.

2. The method of claim 1, further comprising:
   receiving the first request from one of a remote control device or a game controller device.

3. The method of claim 1, further comprising:
   rendering the plurality of graphical user interfaces as a main graphical user interface region and a set of subordinate graphical user interface regions.

4. The method of claim 1, further comprising:
   rendering some of the plurality of graphical user interfaces within at least one of a boundary of the banner interface region or adjacent the boundary of the banner interface region.

5. The method of claim 1, further comprising:
   rendering some of the plurality of graphical user interfaces as one of icons or functionally-named tabs.

6. The method of claim 1, further comprising:
   rendering some of the plurality of graphical user interfaces as animated icons or tabs.

7. The method of claim 1, further comprising:
   rendering some of the plurality of graphical user interfaces as at least one of viewer functions or system functions.

8. The method of claim 7, wherein the viewer functions comprise at least one of a program search function, a previous program function, a station-associated program list, or a recorded program list.

9. The method of claim 7, wherein the system functions comprise at least one of profile set-up, profile editing, device options set-up, or device options editing.

10. The method of claim 1, further comprising:
    triggering execution of an additional video function in response to executing the video function corresponding to the selected one of the plurality of graphical user interfaces.

11. The method of claim 1, wherein rendering the banner interface region with the video content further comprises:
    rendering the video content alternately with the banner interface region, wherein the video content and the banner interface region are not rendered at the same time.

12. The method of claim 1, wherein the selected one of the plurality of graphical user interfaces is larger in area than remaining ones of the plurality of graphical user interfaces.

13. The method of claim 12, further comprising:
    receiving a third request to access a second selected one of the plurality of graphical user interfaces, wherein the first selected one of the plurality of graphical user interfaces contracts in area and the second selected one of the graphical user interfaces expands in area in response to the third request; and
    executing a second video function of the plurality of video functions, the second video function corresponding to the second selected one of the plurality of graphical user interfaces.

14. A system, comprising:
    a display to display video content; and
    a computing device communicatively coupled to the display, the computing device to receive a first request for a banner interface region, to render the banner interface region with video content on the display, the banner interface region including a plurality of graphical user interfaces that map to a corresponding plurality of video functions, to receive a second request to access a selected one of the plurality of graphical user interfaces, and to execute a video function of the plurality of video functions, corresponding to the selected one of the plurality of graphical user interfaces, wherein the plurality of graphical user interfaces are animated to extend outward simultaneously along horizontal directions in response to the first request.

15. The system of claim 14, further comprising:
    a remote control device to initiate the first request and the second request.

16. The system of claim 15, wherein the plurality of graphical user interfaces are directly associated with a corresponding plurality of keys on the remote control device.

17. The system of claim 14, wherein the computing device comprises:
    one of a client and a server.

18. The system of claim 14, wherein the computing device comprises:
    one of a mobile phone and a set top box.

19. A non-transitory machine-readable storage medium comprising instructions, which when executed by one or more processors, cause the one or more processors to perform a method comprising:
    receiving a first request for a banner interface region;
    rendering the banner interface region with video content, the banner interface region including a plurality of graphical user interfaces that map to a corresponding plurality of video functions, wherein the plurality of graphical user interfaces are animated to extend outward simultaneously along horizontal directions in response to the first request;

receiving a second request to access a selected one of the plurality of graphical user interfaces; and executing a video function of the plurality of video functions, corresponding to the selected one of the plurality of graphical user interfaces.

20. The medium of claim 19, wherein the banner interface region appearance is customizable using the first request and multiple ones of the second request.

21. The medium of claim 19, wherein the method further comprises:

rendering one of the plurality of graphical user interfaces as a program search graphical user interface; and rendering a list comprising a new search, favorite searches, and recent searches in response to receiving a selection of the program search graphical user interface.

22. The medium of claim 19, wherein the method further comprises:

rendering one of the plurality of graphical user interfaces as a program search graphical user interface; and rendering a set of selectable characters to be entered as part of a search request in response to receiving a selection of the program search graphical user interface.

23. The medium of claim 19, wherein the method further comprises:

rendering one of the plurality of graphical user interfaces as a previous program graphical user interface; and rendering a list of previously-shown programs, previously-shown programs associated with the video content, previously-shown programs associated with a broadcast station, or previously-shown programs associated with a program viewer in response to receiving a selection of the previous program graphical user interface.

* * * * *